United States Patent [19]
Anand

[11] Patent Number: 6,154,800
[45] Date of Patent: *Nov. 28, 2000

[54] SINGLE ADDRESS QUEUE FOR HANDLING MULTIPLE PRIORITY REQUESTS

[75] Inventor: Vishal Anand, Fremont, Calif.

[73] Assignee: VLSI Technology, Inc., San Jose, Calif.

[*] Notice: This patent is subject to a terminal disclaimer.

[21] Appl. No.: 09/387,868

[22] Filed: Sep. 1, 1999

Related U.S. Application Data

[63] Continuation of application No. 09/005,358, Jan. 9, 1998, Pat. No. 6,076,125.

[51] Int. Cl.[7] ................................................. G06F 13/00
[52] U.S. Cl. ........................ 710/107; 710/3; 710/126; 710/128; 710/129; 710/244; 711/111; 711/112; 711/118; 711/149; 711/151; 711/169; 711/202; 711/206; 345/521
[58] Field of Search .................................. 710/107, 128, 710/3, 244, 126, 129; 711/149, 202, 111, 112, 118, 151, 169, 206; 345/521

[56] References Cited

U.S. PATENT DOCUMENTS

| | | | |
|---|---|---|---|
| 4,807,111 | 2/1989 | Cohen et al. | 710/54 |
| 5,301,333 | 4/1994 | Lee | 395/725 |
| 5,363,485 | 11/1994 | Nguyen et al. | 395/250 |
| 5,418,967 | 5/1995 | Simcoe et al. | 395/725 |
| 5,524,235 | 6/1996 | Larson et al. | 395/478 |
| 5,623,693 | 4/1997 | Ashton et al. | 395/825 |
| 5,809,538 | 9/1998 | Pollmann et al. | 711/151 |
| 5,936,640 | 8/1999 | Horan et al. | 345/501 |
| 6,006,303 | 12/1999 | Barnaby et al. | 710/244 |

*Primary Examiner*—Ayaz R. Sheikh
*Assistant Examiner*—Frantz Blanchard Jean
*Attorney, Agent, or Firm*—Wagner, Murabito & Hao LLP

[57] ABSTRACT

An apparatus for and a method of arbitrating a stream of access requests over multiple outputs. In one embodiment, the apparatus is implemented with $D*[W+(N+1)\log_2 D]$ storage elements, where D is a maximum number of outstanding requests allowed by an issuing agent, N is a number of different request types, and W is a width of access requests measured in bits. The present embodiment comprises a main queue, an input address selection circuit coupled to the main queue for selecting storage locations to receive a stream of access requests, and a plurality of output address selection circuits coupled to the main queue for selecting storage locations to be read. Significantly, the input address selection circuit includes an input address list pointing to vacant storage locations in the main queue, and the input address list is updated each time an access request is stored in, or read out from, the main queue. Further, each output address selection circuit includes an output address list pointing to occupied storage locations in the main queue, and, the output address lists are updated each time an access request is stored in, or read out from, the main queue. The present embodiment further comprises a control circuit for determining a request type of each incoming request, and for transmitting addresses from the input address list to the output address lists each time an access request is stored in the main queue.

8 Claims, 9 Drawing Sheets

SINGLE ADDRESS QUEUE FOR HANDLING MULTIPLE PRIORITY REQUESTS

This application is a continuation of Ser. No. 09/005,358 filed in Jan. 9, 1998 now U.S. Pat. No. 6,076,125.

FIELD OF THE INVENTION

The present invention relates to the field of bus arbitration in computer systems. More specifically, the present invention relates to an apparatus for and a method of arbitrating a stream of data over multiple outputs.

BACKGROUND OF THE INVENTION

The Accelerated Graphics Port (AGP) is a high performance component interface designed specifically for 3-D graphical display applications in personal computers. Essentially, the AGP provides performance enhancement to the PCI bus by allowing graphics accelerators to directly access main system memory. In order to optimize performance, the AGP also provides deeply pipelined memory read and write operations such that main system memory access latency is hidden.

Specifically, AGP transactions are run in a split transaction fashion where the requests for data transfer (or access requests) are "disconnected" from the data transfers. That is, in operation, an AGP compliant device initiates an AGP transaction with an access request. Then, memory controller or core logic responds to the access request by directing the corresponding data transfer at a later time. The fact that the access requests are separated from the data transfers allows AGP compliant devices to issue several access requests in a pipelined fashion while waiting for the data transfers to occur. This feature significantly increases the performance of AGP compliant devices.

In addition to providing pipelined memory read and write operations, the AGP supports two levels of access priorities: high-priority access and low-priority access. Generally, the memory controller subsystem processes high-priority access requests before low-priority access requests. Access requests are further classified into read access requests and write access requests, which, respectively, control read and write operations of the memory controller subsystem. Thus, in an AGP system, access requests may be classified into 4 different request types: high-priority read, high-priority write and their respective low-priority counterparts. An AGP system may also support other access request types, such as long read and long write operations, as well as flushing operations. Further, the AGP also supports multiple request-issuing agents and multiple "slave" devices.

Figure 1:
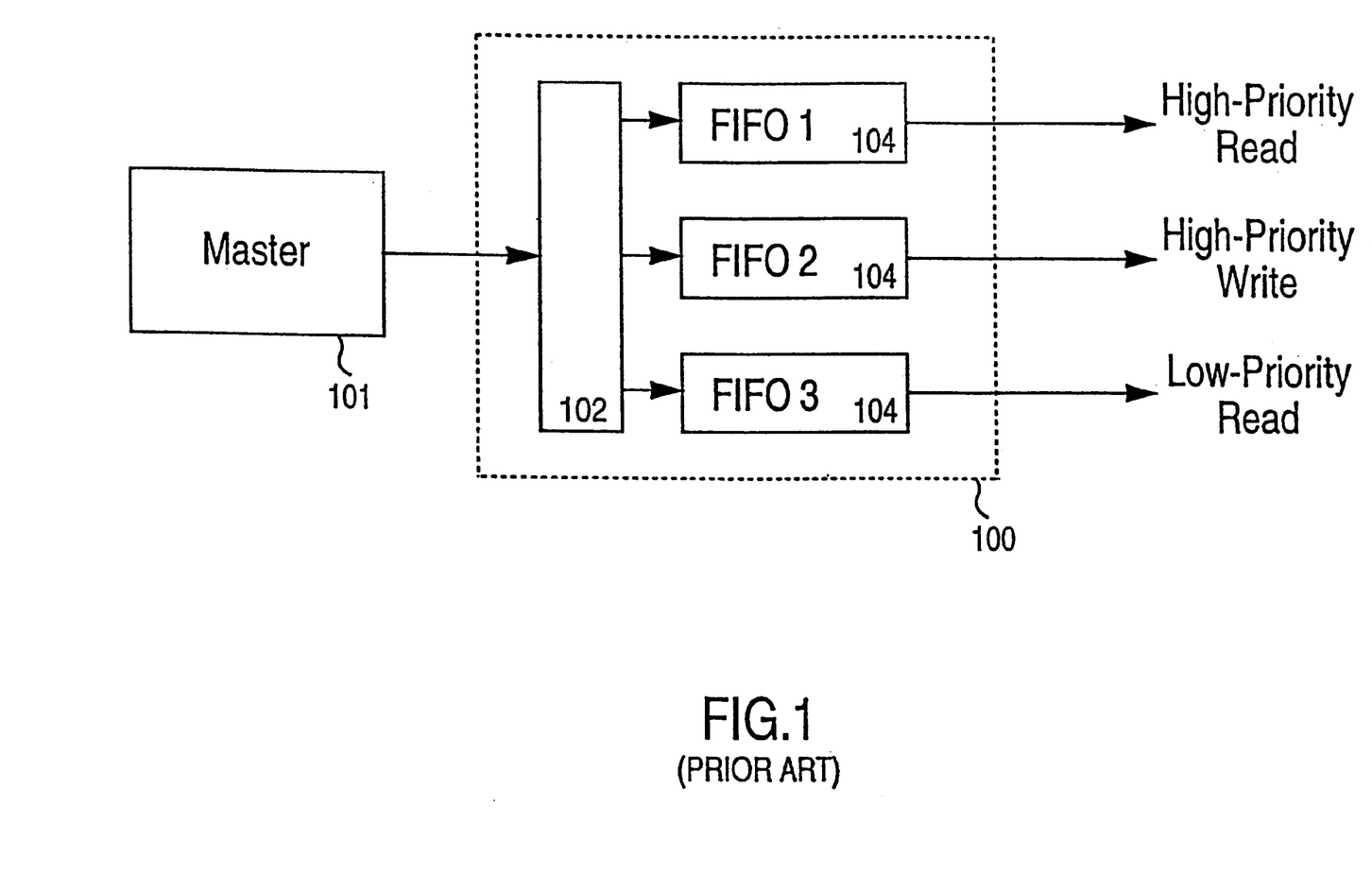
FIG. 1 illustrates a prior art implementation of an access request pipeline.

In order to support these different request types, it is desirable to implement a request pipeline which is capable of separating different types of requests into different subqueues such that each request type may be dealt with separately in the slave device(s). One prior art implementation of such a request pipeline is illustrated in FIG. 1. As shown, the prior art access request pipeline 100 comprises a logic circuit 102 and a plurality of subqueues 104 corresponding to different levels of priorities and/or request types. The request issuing agent or "master" 10 is coupled to provide a stream of requests to logic circuit 102. Logic circuit 102 then determines a priority and/or request type of each request, and places the requests into the corresponding subqueues 104. For instance, a high-priority read access request will be placed in the high-priority read subqueue. Similarly, access requests of other types are placed into other subqueues corresponding to their request types. Typically, each subqueue is implemented by a simple first-in-first-out memory unit (FIFO). That is, each access request will be output in the order in which they are stored in the subqueue.

Although the prior art access request pipeline 100 is useful for its intended purposes, one drawback is that it requires a large number of storage elements. For instance, if a system supports W-bit access requests, N request types, and a maximum number of D outstanding access requests, a minimum number of N*D*W storage elements are required to implement the request pipeline. However, at any one instance, a maximum number of D*W storage elements are used. Thus, a significant number of storage elements are not used at any one time, unnecessarily increasing manufacturing costs and wasting valuable die area of integrated circuits implemented with the prior art access request pipeline 100.

Thus, what is needed is an apparatus for and method of arbitrating a stream of digital data over multiple outputs. What is further needed is an apparatus for and method of arbitrating a stream of requests over multiple outputs using a minimum number of storage elements. What is yet further needed is an apparatus for and method of implementing an access request pipeline for accelerated graphics port (AGP) with a minimum number of storage elements.

SUMMARY OF THE INVENTION

The present invention is an apparatus for and method of arbitrating a stream of access requests over multiple subqueues. In one embodiment, the apparatus is implemented with $D*[W+(N+1) \log_2 D]$ storage elements, where D is a maximum number of outstanding requests allowed by an issuing agent, N is a number of different request types, and W is a width of access requests measured in bits.

One embodiment of the present invention comprises a main queue, an input address selection circuit, and a plurality of output address selection circuits. The input address selection circuit is coupled to the main queue for selecting storage locations to receive a stream of access requests. The input address selection circuit includes an input address list pointing to vacant storage locations in the main queue. Significantly, the input address list is updated each time an access request is stored in the main queue, and each time an access request is read out from the main queue.

The plurality of output address selection circuits are also coupled to the main queue for selecting storage locations to be read. Significantly, the output address selection circuits each includes a output address list pointing to occupied storage locations in the main queue. Further, the output address lists are updated each time an access request is stored in, and read out from, the main queue. In one embodiment, there are N output address selection circuits each corresponding to a particular request type.

One embodiment further comprises a control circuit for determining a request type of each incoming request, and for transmitting addresses from the input address list to the output address lists each time an access request is stored in the main queue. The present embodiment also includes an address multiplexor for selectively transmitting addresses from the output address lists to the input address list each time an access request is read out from the main queue. In this way, storage locations in the main queue are reused, and a number of storage locations required is minimized.

In furtherance of the present invention, the input address selection circuit may comprise a demultiplexor and a first-in-first-out memory device (LOAD FIFO). The demultiplexor includes an input for receiving the stream of access requests, and D output lines each coupled to one storage location in the main queue. The LOAD FIFO stores addresses of vacant storage locations in the main queue, and provides the stored addresses to the demultiplexor each time an access request arrives at the input of the demultiplexor. The demultiplexor, upon receiving the address, selects a corresponding storage location in the main queue to receive the access request. Significantly, LOAD FIFO has a depth equivalent to a number of maximum outstanding requests allowed by the request issuing master, and a width equivalent to a logarithmic value of the maximum outstanding requests allowed.

Each output address selection circuit comprises a multiplexor and a first-in-first-out memory device (UNLOAD FIFO). Each multiplexor includes D input lines each coupled to one of the storage locations in the main queue, and an output line for providing access requests of a particular type to a slave device. Each UNLOAD FIFO stores addresses of occupied storage locations in the main queue, and provides the stored addresses to one of the multiplexors. The multiplexors, upon receiving the addresses, select a corresponding storage location in the main queue to provide the stored access requests at the outputs. Significantly, UNLOAD FIFO has a depth equivalent to a number of maximum outstanding requests allowed by the request issuing master, and a width equivalent to a logarithmic value of the maximum outstanding requests allowed. The control circuit also determines which multiplexor will be activated to provide the stored access requests at its outputs.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PRESENT INVENTION

In the following detailed description of the present invention, an apparatus for and method of arbitrating a stream of data over multiple outputs, numerous specific details are set forth in order to provide a thorough understanding of the present invention. However, it will be recognized by one skilled in the art that the present invention may be practiced without these specific details or with equivalents thereof. In other instances, well know methods, procedures, components, and circuits have not been described in detail as to avoid unnecessarily obscuring aspects of the present invention.

For clarity, the present invention is discussed in relation to arbitration of access requests over multiple outputs. However, it should be understood that the scope of the present invention should not be limited to access requests arbitration. Rather, it should be apparent to those skilled in the art, upon reading this disclosure, that the present invention and principles described herein may be applied to other digital systems such as packet switched microprocessors and memory arbiters as well.

In the following description, it is assumed that a maximum number of outstanding access requests allowed to be issued by an issuing agent is D. That is, the issuing agent will stop issuing access requests if there are already D access requests pending. In addition, in the following, it is assumed that there are N types of access requests. Accordingly, in the present embodiment, the stream of access requests are arbitrated over N outputs. However, it should be apparent to those ordinarily skilled in the art, upon reading the disclosure, that the maximum number of outstanding access requests and the number of request types are arbitrary, and they may vary according to different system designs. For instance, in a deeply pipelined AGP system, D may equal 256 and N may equal 4.

Figure 2:
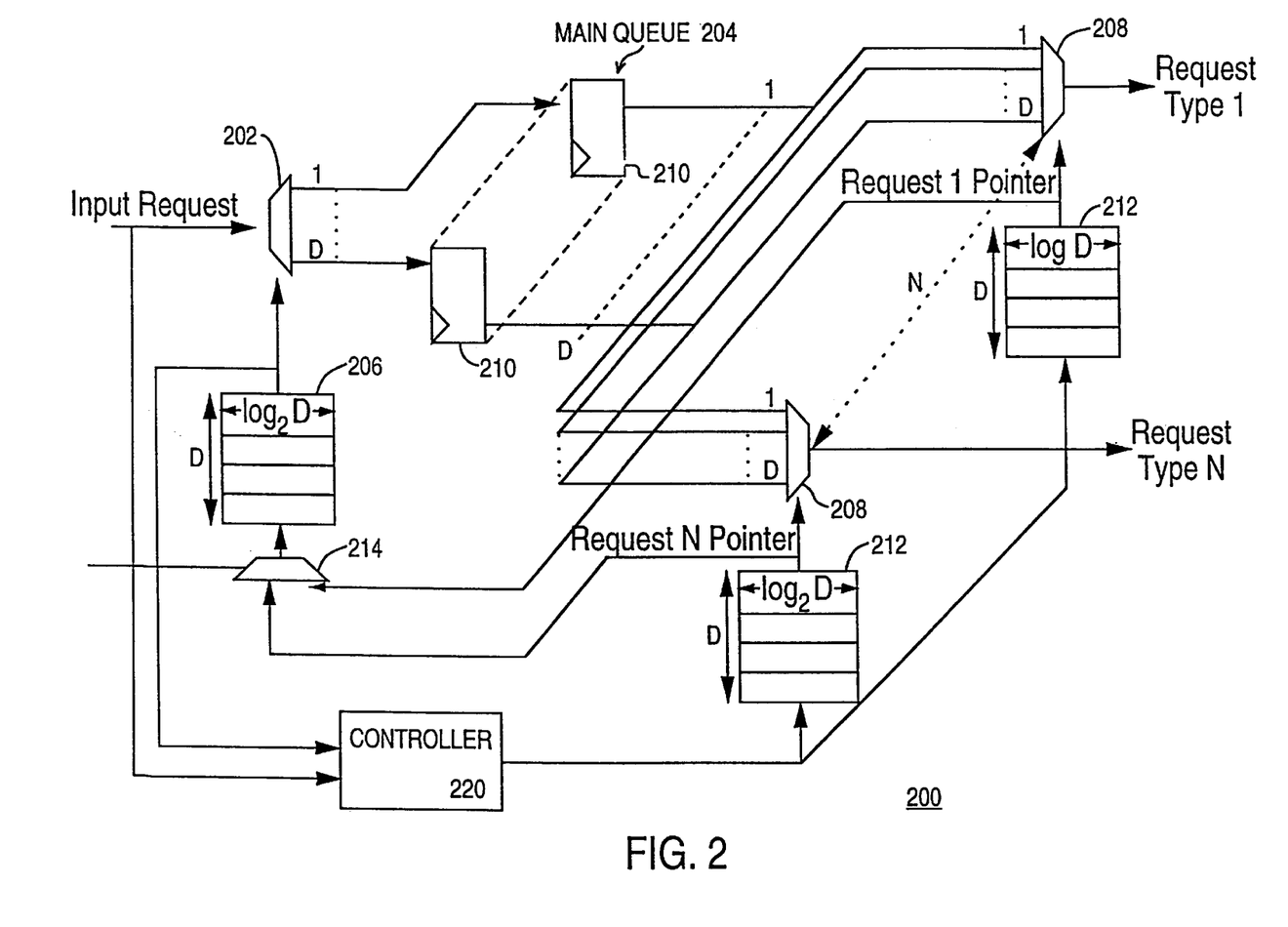
FIG. 2 illustrates a schematic of one embodiment of the present invention.

FIG. 2 is a schematic diagram of an access request arbiter 200 according to one embodiment of the present invention. As shown, access request arbiter 200 comprises a demultiplexor 202, an input address store 206, a main queue 204 including a plurality of storage locations 210, a plurality of multiplexors 208, a plurality of output address stores 212, a control circuit 220, and an address multiplexor 214. According to the present embodiment, storage locations 210 in main queue 204 have a width of W bits for storing access requests which are W bits wide. Further, in the present embodiment, there are D storage locations 210 within main queue 204. Thus, a total number of D*W storage elements are necessary to implement main queue 204.

In the present embodiment, demultiplexor 202 includes a data input coupled to receive the request stream from an issuing agent or "master" device (not shown). Demultiplexor 202 then distributes the stream over the plurality of storage locations 210 in main queue 204 via a plurality of output lines. Significantly, in the present embodiment, main queue 204 includes a same number of storage locations 210 as the maximum number of outstanding access requests allowed by the issuing agent, D. Further, in the present embodiment, demultiplexor 202 has D output lines each coupled to one storage element 210 in main queue 204. Additionally, the issuing agent maybe a central processing unit (CPU) of a computer. In other embodiments, graphic processors and other computer subsystems that issue requests may be used.

Demultiplexor 202 also includes a selector input coupled to receive addresses from input address store 206, which stores a list of addresses pointing to vacant storage locations 210 of main queue 204. Input address store 206 provides the stored addresses to the demultiplexor 202 each time an access request arrives at the data input of demultiplexor 202. Demultiplexor 202, upon receiving the address, selects a corresponding storage location 210 of main queue 204 to receive the access request. Significantly, input address store 206 has a depth equivalent to a number of maximum outstanding requests allowed by the request issuing device, D. Preferably, the addresses are stored in binary form, and have a width of $\log_2 D$. For instance, one storage location in a main queue having 256 storage locations may be represented by a 8-bit address such as 0101 1101. Accordingly, input address store 206 has at least $D*\log_2 D$ storage elements. Further, each input address store 206 may be implemented with a first-in-first-out memory device (FIFO).

According to the particular embodiment as illustrated in FIG. 2, each multiplexor 208 includes D input lines each coupled to one storage location 210 of main queue 204, and an output. As illustrated, access request arbiter 200 includes N multiplexors 208 each corresponding to a different request type. For instance, access request arbiter 200 may include four multiplexors 208 corresponding to High-Priority Read Requests, High-Priority Write Requests, Low-priority Read Requests, and Low-Priority Write Requests, respectively.

Each multiplexor 208 includes a selector input coupled to receive output addresses from one of the output address stores 212. In the present embodiment, there are N output address stores 212 each coupled to one of multiplexor 208. Further, each output address store 212 stores a list of addresses pointing to storage locations 210 which contain access requests of one particular request type. For example, suppose an output address store 212a is coupled to a multiplexor 208a which handles "High-Priority Read" requests. That output address store 212a would then contain a list of addresses pointing to a particular one of storage locations 210 which contains "High-Priority Read" requests. In the event that main queue 204 does not contain any "High-Priority Read" requests, output address store 212a would be empty.

Multiplexors 208, upon receiving the output addresses from output address stores 212, select appropriate storage locations 210 of main queue 204 such that contents of the selected storage locations 210 may be read out at the outputs of multiplexors 208. Similar to input address store 206, each output address store 212 has a depth of D, and a width of $\log_2 D$. Consequently, each output address store 212 has $D*\log_2 D$ storage elements. Thus, a system having N output address stores 212 requires $N*D*\log_2 D$ storage elements. Further, each output address store 212 may be implemented with a first-in-first-out memory device (FIFO).

Access request arbiter 200 according to the present invention further comprises a control circuit 220 coupled to receive an access request concurrently with demultiplexor 202. Control circuit 220 is also coupled to the selector input of demultiplexor 202 to receive the address of one storage location 210 currently selected by demultiplexor 202. As the access request is stored in main queue 204 at the selected storage location 210, the access request and the address of the selected storage location 210 are analyzed by control circuit 220. Then, according to the request type of the access request, control circuit 220 transmits the address to an appropriate one of output address stores 212. For instance, suppose a "High-Priority Read" request is written to one storage location 210 corresponding to the address 0101 1101, control circuit 220 will transmit the address 0101 1101 to one of the output address stores 212 associated with "High-Priority Read" requests.

Access request arbiter 200 of the present invention includes an address multiplexor 214 having a plurality of inputs coupled to address select inputs of multiplexors 208, and an output coupled to provide a selected address to input address store 206. Address multiplexor 214 chooses one of multiplexors 208 and transmits the address supplied to the chosen multiplexor 208 to input address store 206. For instance, suppose address 0101 1101 is provided to multiplexor 208a such that content of storage location 210 corresponding to the address may be accessed. Thereafter, address multiplexor 214 selects multiplexor 208a, and the address 0101 1101 will then be appended to the input address store 206.

Significantly, in the present embodiment, a total number of storage elements required would be equal to the sum of the number of storage elements in main queue 204, input address store 206, and output address stores 212. As discussed, main queue 204 requires $D*W$ storage elements, input address store 206 requires $D*\log_2 D$ storage elements, and output address stores 212 require $N*D*\log_2 D$ storage elements. Consequently, the present embodiment requires a total number of $D*[W+(N+1)\log_2 D]$ storage elements. Further, for the present embodiment to be smaller than the traditional implementation of an access request pipeline, $$D*[W+(N+1)\log_2 D] < N*W*D.$$

Thus, $$W < (N+1)/(N-1) * \log_2 D.$$

Accordingly, for a system supporting 4 request types and a pipeline depth of 256, the access requests must be less than 14 bits wide for the present invention to be significantly advantageous over the prior art access request pipeline.

Operations of the present invention will be discussed in greater detail the following in conjunction with FIGS. 3A–3G. Specifically, FIGS. 3A–3G depict a particular embodiment of the present invention where D=4 and N=2. As mentioned, the maximum number of storage locations and the number of different request types are arbitrary, and the illustrated principles, methods, and procedures are also applicable to different embodiments of the present invention having different values of D and N.

With reference to FIGS. 3A–3G, access request arbiter 300 of the present invention comprises a demultiplexor 302, an input address store 306, a main queue 304 including four storage locations 310, two multiplexors 308, two output address stores 312, a control circuit 320, and an address multiplexor 314. Further, FIGS. 3A–D illustrate the "load" operations of access request arbiter 300 when storing an incoming requests stream, READ, WRITE, WRITE, READ, into main queue 204. For simplicity, access request arbiter 300 only supports two request types READ and WRITE. Accordingly, access request arbiter 300 includes two outputs corresponding to READ requests and WRITE requests, respectively.

Figure 3A:
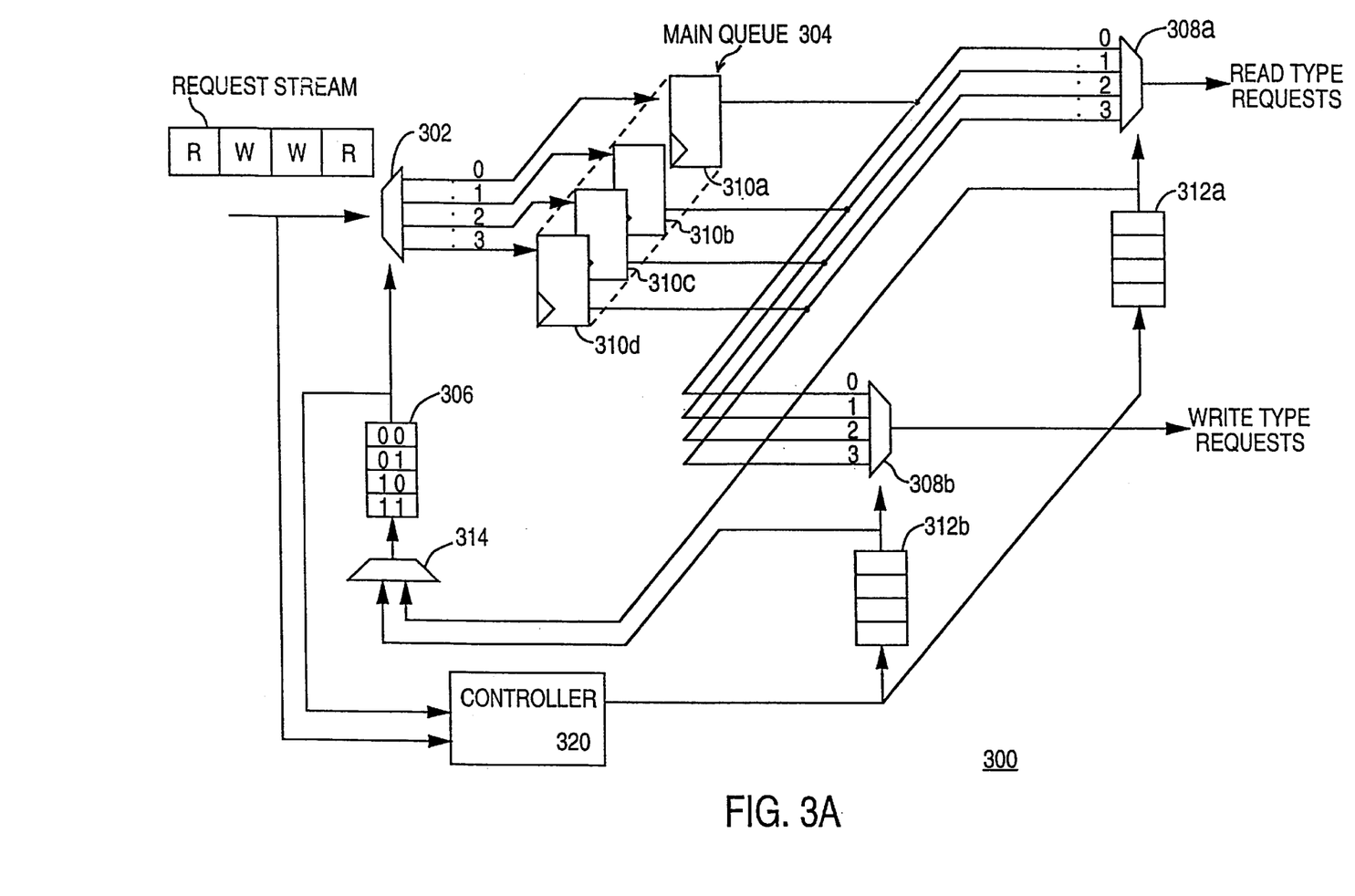
FIG. 3A illustrates a schematic of one embodiment of the present invention where N=2 and D=4 before a stream of access requests Read, Write, Write, Read, are stored.

In FIG. 3A, main queue 304 is empty. Output address stores 312a–b are also empty, since none of storage locations 310a–d contain any access requests. On the other hand, input address store 306 contains addresses pointing to vacant storage locations 310a–d of main queue 304. Significantly, address 00, which points to storage location 310a of main queue 304, is provided to the address select input of demultiplexor 302. As a result, the first READ request will be written into storage location 210a. At the same time, the first READ request is analyzed by control circuit 320. Upon determining the request type of the first READ request, the address 00 will be transmitted to output address store 312a, which corresponds to READ type requests.

Figure 3B:
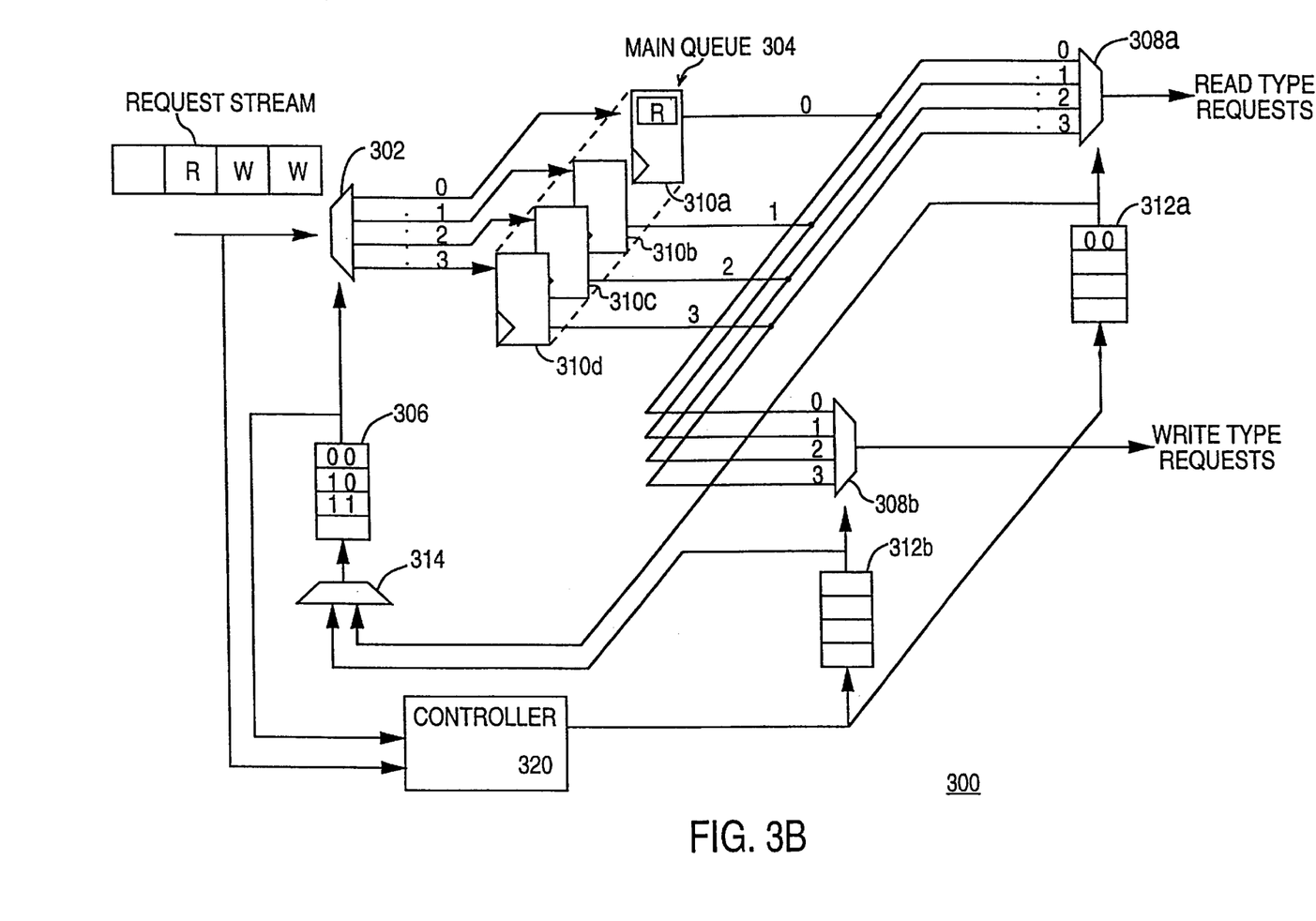
FIG. 3B illustrates a schematic of the embodiment as shown in FIG. 3A after the first Read request is stored.

In FIG. 3B, the first READ request is already stored in storage location 310a, and the address 00 is stored in output address store 312a. The first WRITE request is ready to be written to main queue 304. Input request store 206 has removed address 00, and, address 01, which is pointing to storage location 210b, is provided to demultiplexor 202. Thus, the first WRITE request will be written to storage location 210b. At the same time, the first WRITE request is analyzed by control circuit 320. Upon determining the request type of the first WRITE requests, address 01 will be transmitted to output address store 312b, which corresponds to the WRITE request type. After the first WRITE request is written to main queue 304, address 01 is also removed from input address store 306.

Figure 3C:
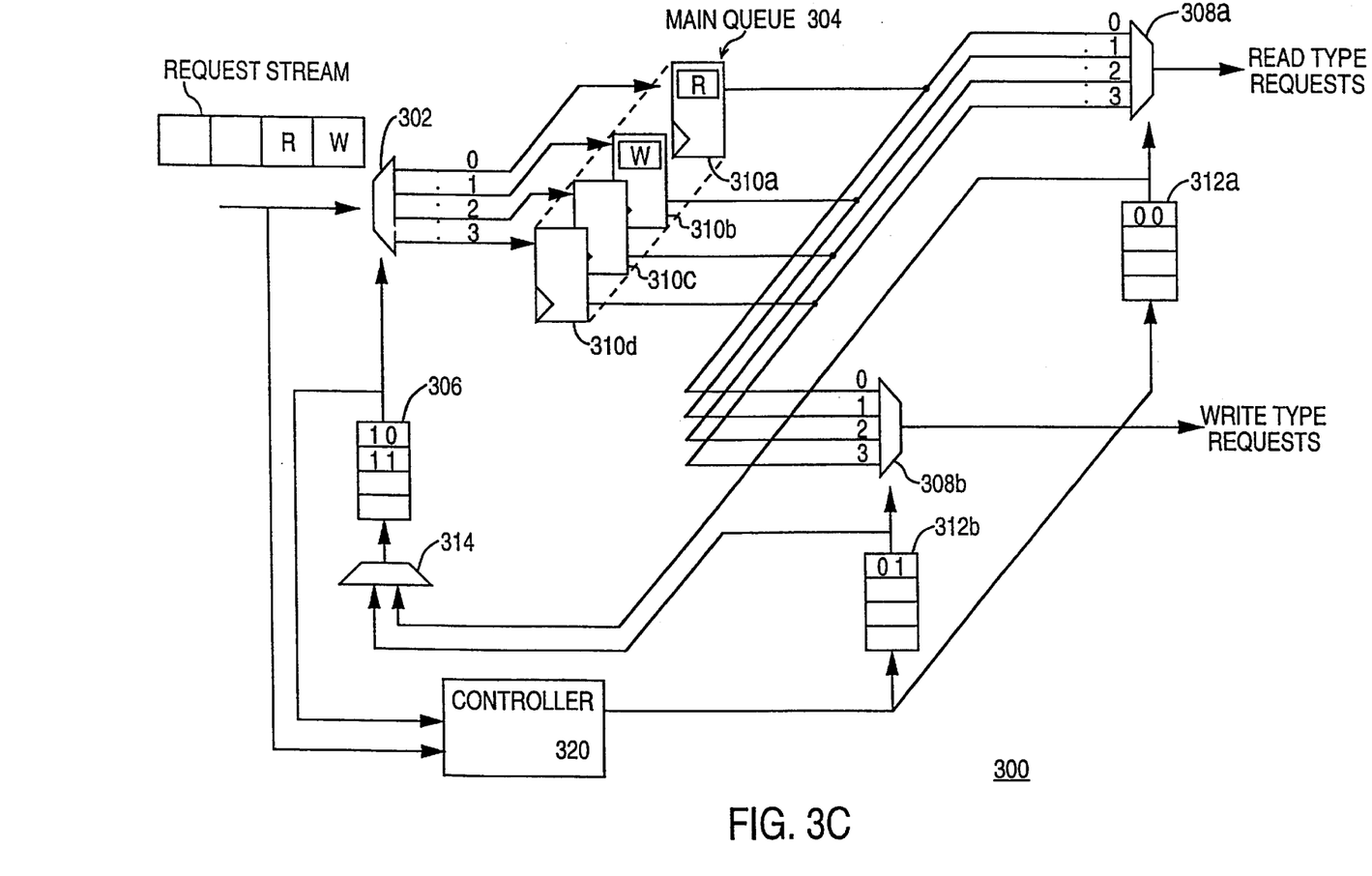
FIG. 3C illustrates a schematic of the embodiment as shown in FIG. 3A after the first Read request and the first Write request are stored.
Figure 3D:
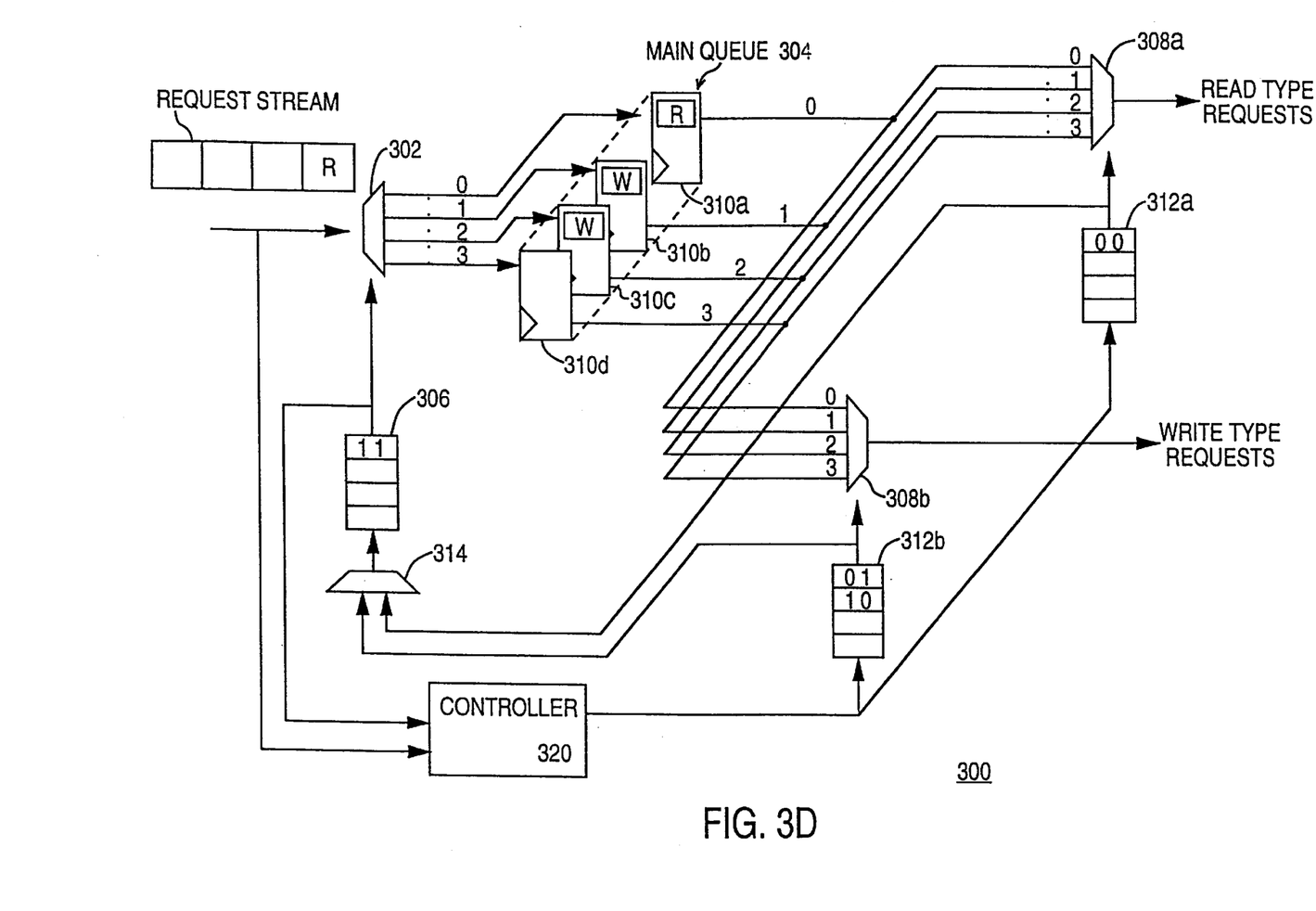
FIG. 3D illustrates a schematic of the embodiment as shown in FIG. 3A after the first Read request, the first and second Write requests are stored.

With reference to FIGS. 3C and 3D, the second WRITE requests and the second READ requests are subsequently written into storage locations 210c and 210d. Addresses 10 and 11 are also subsequently removed from input address store 206, and appended to output address stores 212b and 212a, respectively.

Figure 3E:
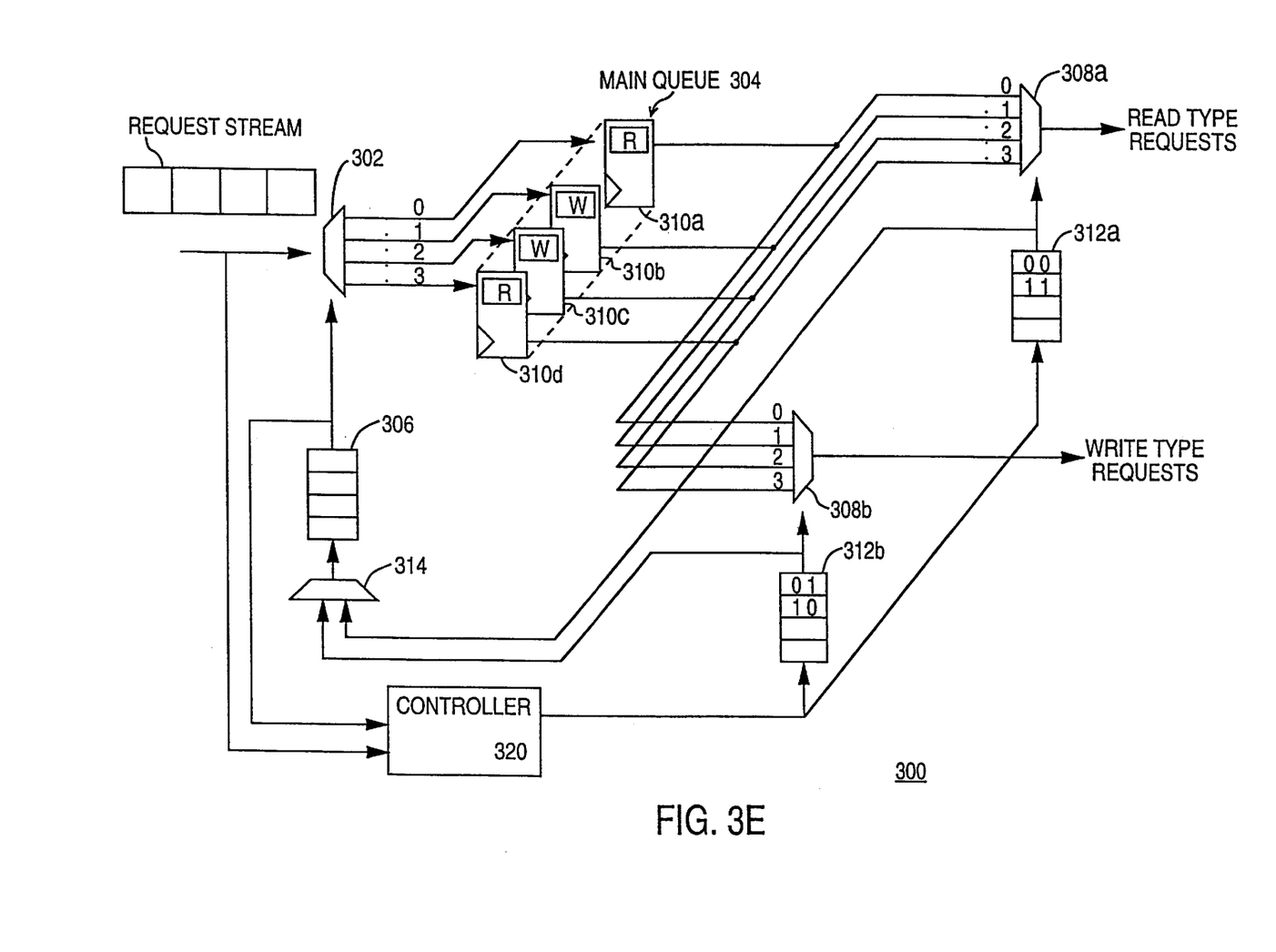
FIG. 3E illustrates a schematic of the embodiment as shown in FIG. 3A after the stream of access requests Read, Write, Write, Read, are stored.
Figure 3F:
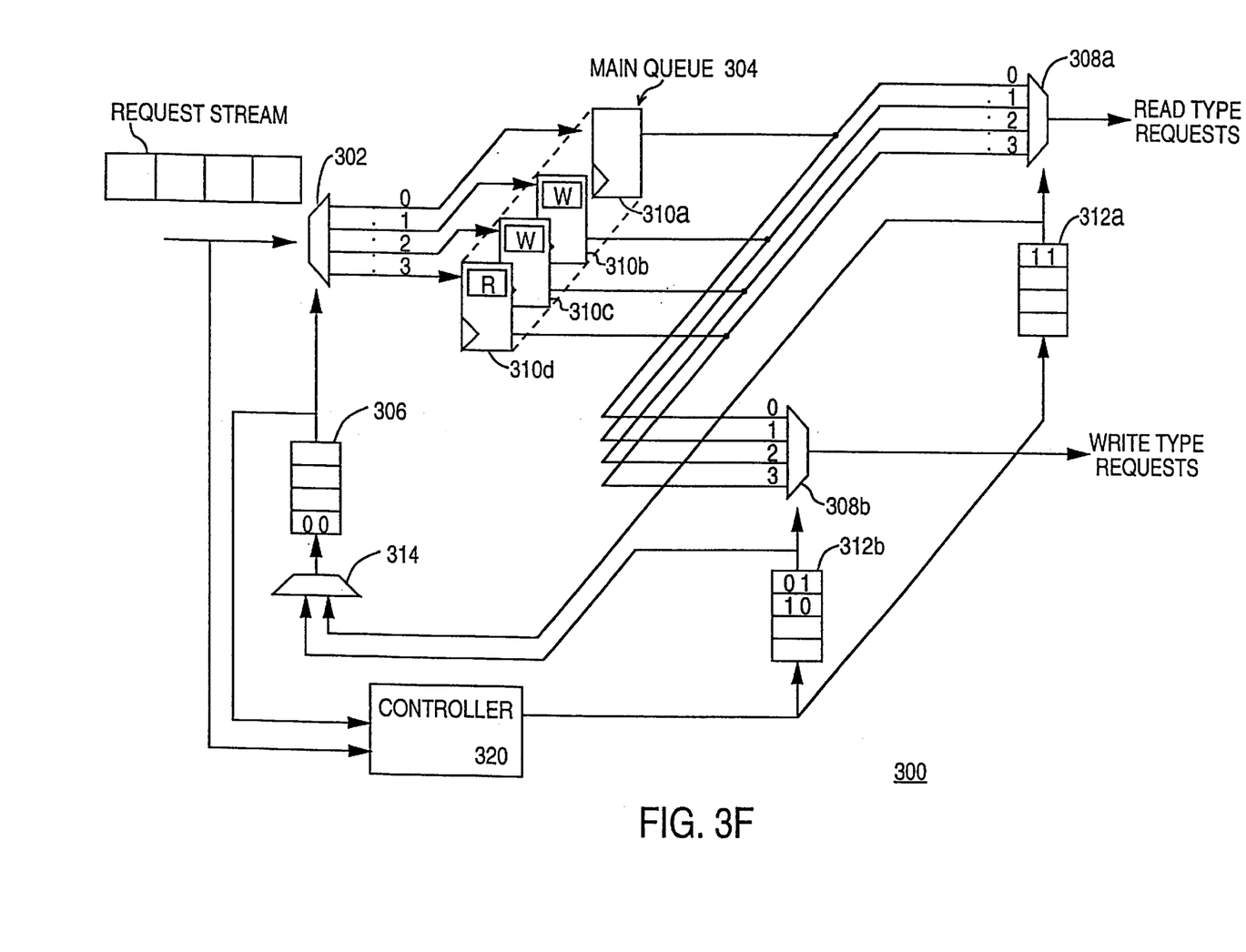
FIG. 3F illustrates a schematic of the embodiment as shown in FIG. 3E after the first Read request is unloaded.
Figure 3G:
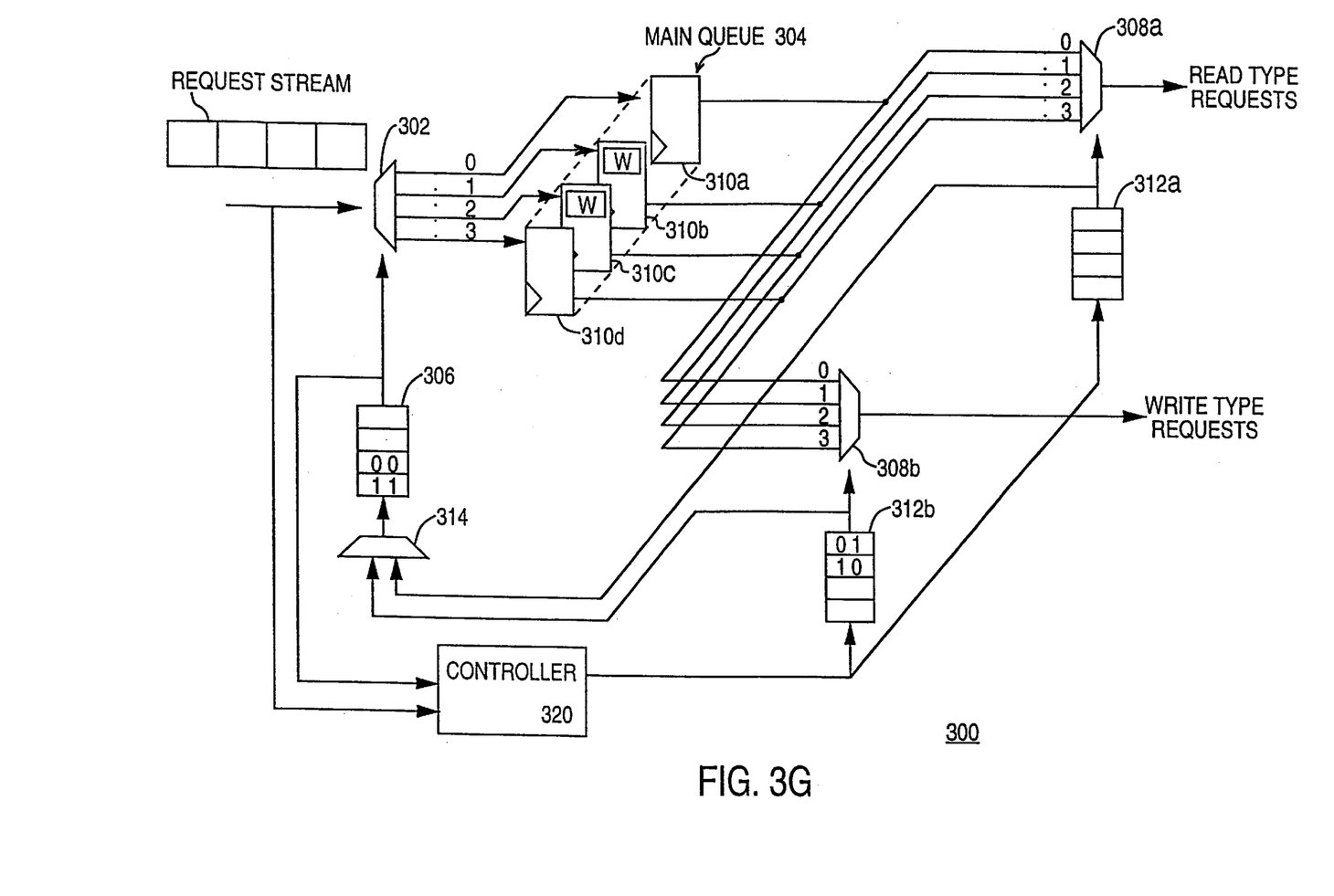
FIG. 3G illustrates a schematic of the embodiment as shown in FIG. 3E after the first and second Read requests are unloaded.

FIGS. 3E–3G illustrate "unload" operations of access request arbiter 300 when stored access requests are read out. In the exemplary embodiment as illustrated in FIGS. 3E–3G, READ requests have a higher priority than WRITE requests. Thus, READ requests are unloaded before WRITE requests. As illustrated, storage locations 310a–d contain access requests READ, WRITE, WRITE, READ, respectively. Because storage locations 310a and 310d contain the READ requests, output address store 312a contains address 00 followed by address 11. Similarly, output address store 312b, which corresponds to WRITE requests, contains address 01 followed by address 10. As illustrated in FIG. 3E, output address store 312a provides address 00 to multiplexor 308a to select storage location 310a, and output address store 312b provides address 01 to multiplexor 308b to select storage location 310b. As a result, when outputs of access request arbiter 300 are accessed, the first READ request and the first WRITE request will be read out.

With respect to FIG. 3F, access request arbiter 300 of the present invention has already unloaded the first READ request. Thus, storage location 210a is conceptually "empty." That is, content of storage location 210a may now be over-written by new data. Since storage location 310a is available to receive incoming access requests, address 00 is removed from output address store 312a and is appended to input address store 306. For simplicity, in the illustrated embodiment in FIGS. 3A–3G, no more access requests are issued. However, it should be apparent to those ordinarily skilled in the art, upon reading the present disclosure, that "unload" operations illustrated in FIGS. 3E–G may be integrated with "load" operations illustrated in FIGS. 3A–D such that one of the storage locations 310 may be unloaded while another is being loaded.

With reference to FIG. 3G, the access request arbiter 300 of the present invention has unloaded the second READ request. Thus, storage location 310d is available to be over-written by an incoming request. Accordingly, address 11 is removed from output address store 312a and is appended to input address store 306. The "unload" operations illustrated in FIGS. 3E–3G may be repeated with WRITE requests stored in storage locations 310b–c to provide the WRITE requests at the respective output.

An apparatus for and a method of arbitrating a stream of access requests over multiple request outputs have thus been disclosed. The present invention is advantageous over prior art implementations because fewer storage elements are required. Specifically, a total number of $D*[W+(N+1)\log_2 D]$ storage elements are needed to implement an access request arbiter for arbitrating D access requests having a width of W bits over N request subqueues. In comparison with prior art access request pipelines, where a minimum number of $N*D*W$ storage elements are necessary, the present invention is significantly smaller. Accordingly, a significant amount of die area and manufacturing cost is saved when the present embodiment is implemented on an integrated circuit.

What is claimed is:

1. An apparatus for arbitrating a stream of access requests over a plurality of outputs, the apparatus comprising:

a memory having a first plurality of storage locations for temporarily storing said stream of access requests, wherein said first plurality includes D storage locations and wherein each of said first plurality of storage location is configured for storing access requests having a width of W bits;

a memory address store having a second plurality of storage locations for tracking content of each of said first plurality of storage locations, wherein each of said second plurality of storage locations is configured for storing addresses of said first plurality of storage locations and wherein each of said addresses has a width of $\log_2 D$ bits;

a logic circuit for causing said memory to read out content of said first plurality of storage locations to a respective one of said plurality of outputs according to an ordering of said addresses in said second plurality of storage locations, and wherein a maximum number of storage elements required for implementing said apparatus is $D*[W+(N+1)\log_2 D]$ where N represents a total number of said plurality of outputs.

2. An apparatus as recited in claim 1 wherein said memory address store comprises a single input address store and a plurality of output address stores each corresponding to one of said plurality of outputs.

3. An apparatus as recited in claim 2 wherein said single input address store maintains an input address list.

4. An apparatus as recited in claim 3 wherein said input address store removes an address of a vacant storage location from said input address list when an access request is loaded into said memory.

5. An apparatus as recited in claim 3 wherein said input address store adds an address of a vacant storage location to said input address list when an access request is unloaded from said memory.

6. An apparatus as recited in claim 2 wherein each of said output address stores comprises maintains an output address list corresponding to a respective one of said plurality of outputs.

7. An apparatus as recited in claim 6 wherein each of said output address stores maintains a output address list corresponding to a respective one of said plurality of outputs.

8. An apparatus as recited in claim 7 wherein said input address store receives addresses of vacant storage locations from said output address stores when access requests are unloaded from said memory.

* * * * *